Figure 1:
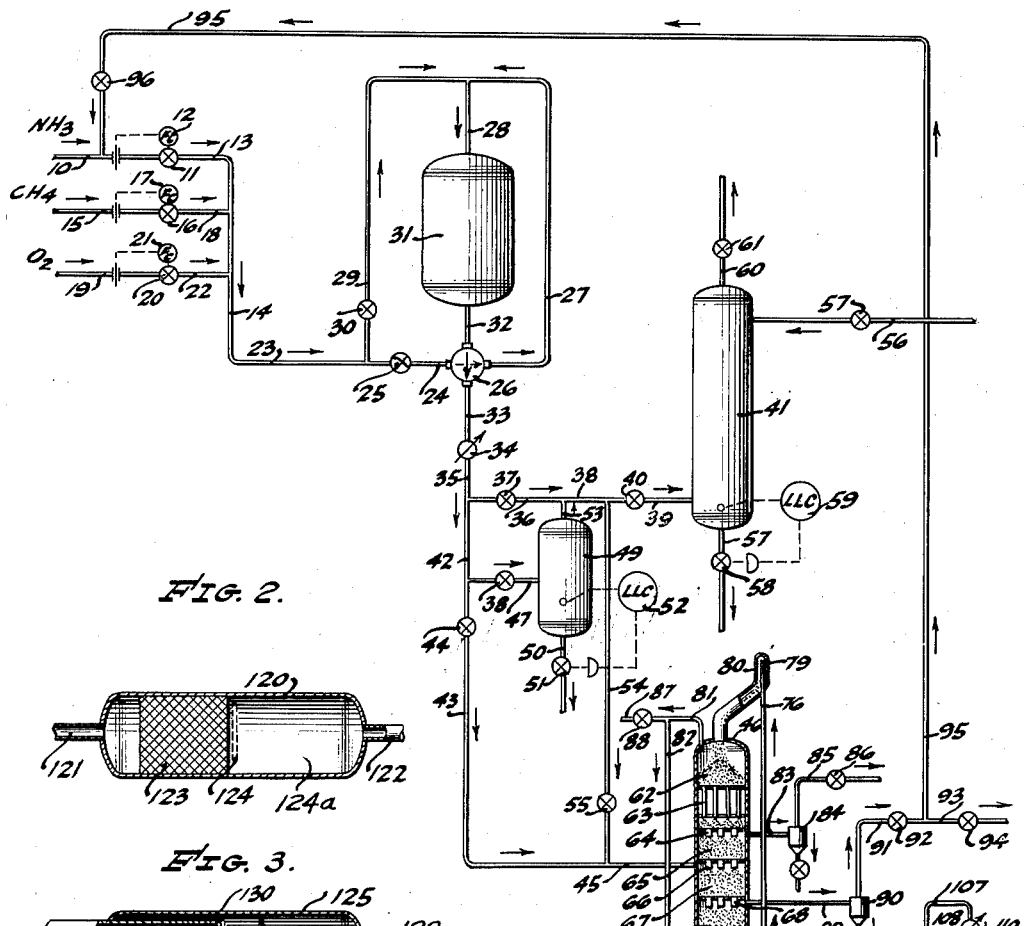

May 13, 1952  A. C. McKINNIS  2,596,421
FLAME SYNTHESIS OF HYDROGEN CYANIDE
Filed April 12, 1948

INVENTOR.
ART C. McKINNIS
BY Ross J. Garofalo
ATTORNEY

Patented May 13, 1952

2,596,421

UNITED STATES PATENT OFFICE 2,596,421

FLAME SYNTHESIS OF HYDROGEN CYANIDE

Art C. McKinnis, Long Beach, Calif., assignor to Union Oil Company of California, Los Angeles, Calif., a corporation of California Application April 12, 1948, Serial No. 20,489

7 Claims. (Cl. 23—151)

This invention relates to a process for the synthesis of hydrogen cyanide from a gaseous mixture containing ammonia, oxygen and a hydrocarbon. More particularly it pertains to the synthesis of hydrogen cyanide by flame reactions in which contact times such as $1 \times 10^{-4}$ seconds or less are conducive to high conversions.

Hydrogen cyanide is an industrial commodity having large and widely varied uses. This material is used in metallurgical operations involving metal smelting and plating, as a military poison, as a reagent in the synthesis of many synthetic dyestuffs, as a reagent in the chemical industries for preparing acrylonitrile, pharmaceuticals, various chemical intermediates and cyanhydrins, in the preparation of oxy-acids from aldehydes and ketones, in food industries as a fumigant in treating grain elevators and as a disinfectant for flour and other foods, as an insecticide in warehouses for combating rats and vermin in ships, as a general fumigant and insecticide for citrus and other fruit trees, in the rubber industry as an accelerator in the coagulation of latex, in textile industries for the treatment of raw cotton, and in agriculture where it is used as a soil disinfectant and as a general parasiticide.

Hydrogen cyanide has been prepared by a wide variety of chemical reactions some of which have become commercially practical. One commercial production method involves the reaction of hydrogen and ammonia with either carbon monoxide, carbon dioxide or acetylene catalyzed by the presence of heated platinum. A second commercial operation is the reaction between nitric oxide and a hydrocarbon under the influence of a hot platinum-rhodium catalyst. The third commercially successful method is that involving the reaction of ammonia, oxygen and a hydrocarbon in the presence of a platinum catalyst in which a hydrogen to ammonia ratio of between 3 to 1 and 5 to 1 is employed.

The three processes named above are the principal ones employed in the United States for hydrogen cyanide production and the principal disadvantage to these is the requirement of an expensive and an easily poisoned platinum metal catalyst. In general, these processes require extensive installations of complex equipment.

The process of the present invention overcomes most of the serious difficulties inherent in the conventional processes in that no catalyst is required, thus eliminating poisoning problems, the conversions are as high as or higher than those previously obtained, and the raw materials are readily available. The elimination of expensive catalysts and the simplicity of the equipment are outstanding advantages. The process of the present invention also generally involves the liberation of heat in which little if any extraneous heat is needed to maintain the reaction. The reaction may be carried out if desired without preheating the reacting gases.

It is an object of this invention to provide an improved process for the non-catalytic preparation of hydrogen cyanide by a flame reaction.

It is another object of this invention to provide an improved process for the production of hydrogen cyanide by flame synthesis which involves a reaction zone adapted to the maintenance of thin flames in which chemical reactions may be effected at contact times of less than about $1 \times 10^{-4}$ seconds and at high reaction rates.

Other objects and advantages of the present invention will become apparent to those skilled in the art as the description thereof proceeds.

Briefly, the present invention comprises in its preferred modification the preparation of a gaseous mixture containing ammonia, oxygen and a hydrocarbon which is preferably of low molecular weight and normally gaseous. This gaseous mixture may be preheated by indirect exchange with the hot effluent gases or introduced into the flame synthesis reactor at atmospheric temperature. The reaction of the reactant gases in the flame reactor goes approximately according to the following equation in which methane is assumed to be the hydrocarbon:

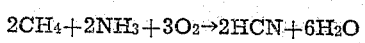

$$2CH_4 + 2NH_3 + 3O_2 \rightarrow 2HCN + 6H_2O$$

This reaction does not proceed appreciably according to the above equation without the maintenance of a flame of the proper characteristics.

Attempts to effect this reaction of ammonia, oxygen, and methane in a heated tube without the maintenance of a flame have resulted in negligible conversions to hydrogen cyanide. It is believed that the success of the process according to this invention is attributable to effecting the conversion of ammonia and methane to hydrogen cyanide at elevated temperatures and at an extremely short contact time of the order of $1 \times 10^{-4}$ seconds through the medium of flame synthesis in which thin flames are maintained. The yields of hydrogen cyanide thus obtained are at least equal to or exceed those realized in the conventional processes employing expensive rare metal catalysts.

A gas, also herein termed a reactor effluent gas, is thus produced which contains hydrogen cyanide and water vapor together with nitrogen and a small amount of unreacted ammonia. In the preferred modification, this effluent gas is cooled and introduced as feed gas to a selective adsorption column wherein the hydrogen cyanide is recovered from the gaseous mixture as a substantially pure fraction. Unreacted ammonia is also recovered and recirculated to the reactor with fresh ammonia feed. Ammonia conversions of greater than 90% to hydrogen cyanide have been thus obtained.

In flame reactions, the flame temperature causes very high chemical reaction rates so that in many cases the primary desired reaction occurs almost completely during the short contact time. Undesired by-products form through degradation of the desired product or of the reactant materials. The rate of flame propagation, which is determined in turn by the combustion rate or the ignition rate of the combustible mixture, determines the maximum allowable space velocity in the synthesis reactor. This consideration together with the physical shape and size of the flame directly determines the contact time obtained for a given reaction. Cylindrical or cone shaped flames give long contact times and thin flat flames permit very short times, the latter being highly desirable in the process of this invention.

The present invention is primarily directed to the short contact time, high temperature flame synthesis of hydrogen cyanide from a gaseous mixture containing ammonia, oxygen, and a low molecular weight hydrocarbon.

Figure 2:
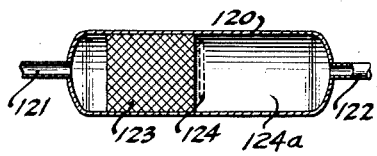
Figure 3:
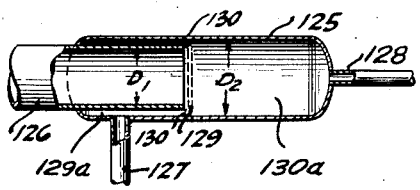
Figure 4:
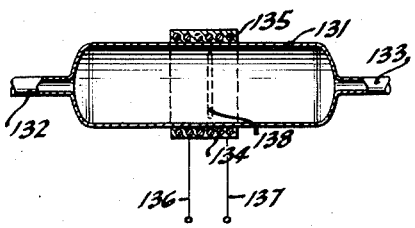

The process may be more fully described and understood by reference to the accompanying drawings in which;

Figure 1 represents a schematic flow diagram of the preferred modification of the combined flame synthesis and selective adsorption separation process for the production of hydrogen cyanide, Figure 2, Figure 3 and Figure 4 represent cross sections of suitable apparatus in which the flame reaction may be carried out.

The following description of Figure 1 may be considered as a practical example of one modification of this invention for the synthesis of hydrogen cyanide by a non-catalytic flame reaction.

Referring now more particularly to Figure 1, ammonia is introduced at a rate of 11.9 mols per hour through line 10 controlled by valve 11 at a rate determined by flow controller 12 and is introduced by means of line 13 into reactant gas mixing manifold 14. The low molecular weight hydrocarbon in this modification is methane, although other low molecular weight hydrocarbons such as ethane, propane, butane, and higher, as well as the unsaturated low molecular weight normally gaseous hydrocarbons such as ethylene, acetylene, propylene, and the like, may be used. The hydrocarbon is introduced by means of line 15 controlled by valve 16 at a rate of 11.9 mols per hour determined by flow controller 17 and is passed through line 18 into manifold 14. The source of oxygen in this particular example is atmospheric air which is introduced through line 19 controlled by valve 20 at a rate of 76.2 mols of air per hour determined by flow controller 21. This quantity of air contains 16.0 mols of oxygen. The air is then passed by means of line 22 into reactant gas manifold 14. Reactant gas manifold 14 may comprise a packed tube, and may be provided with a series of off-set orifices to insure adequate mixing of the incoming gas mixture.

The reactant gases pass from manifold 14 through line 23 and may be directly introduced without preheating into reactor 31 via line 29 controlled by valve 30 and through inlet manifold 28. When it is desirable to preheat the reactant gases they pass via line 24 controlled by valve 25 into interchanger 26 wherein an indirect heat exchange with hot reactor effluent gases is effected. Other sources of heat may, of course, be used. The preheated gases pass via line 27 and manifold 28 into the reactor.

The degree to which the reactant gases are preheated, if at all, is largely dependent upon the composition of the reactant gases and particularly upon the oxygen concentration, which in turn depends upon the source of the oxygen-containing gas, and may vary from atmospheric temperature to as high as about 800° C. The oxygen-containing gas thus employed may be air, oxygen enriched air, or substantially pure oxygen. Any of these oxygen sources may be employed under proper reaction conditions for the efficient conversion of ammonia to hydrogen cyanide in the presence of methane. It has been found that the oxygen to ammonia ratio in particular affects the ammonia conversion and determines whether or not a flame may be maintained. As the oxygen to ammonia ratio is decreased, i. e. the oxygen concentration of the reactant gases is reduced, a point is reached at which the flame is extinguished. At increased reactant gas preheat temperatures the critical oxygen to ammonia ratio at flame extinction decreases, thus permitting lower oxygen to ammonia ratios to be employed. The theoretical oxygen to ammonia ratio for this reaction is 1.5 and the ammonia to methane ratio is 1.0. When introducing the reactant gases at room temperature using air as the source of oxygen, the flame may not be maintained at an air to ammonia ratio of less than 2.2 which is well above the theoretical. Upon preheating the reactant gases to a temperature of about 800° C. in a system having the same methane to ammonia ratio of 1.0, the critical air to ammonia ratio at flame extinction decreases to about 1.2 which is below the stoichiometric ratio in the theoretical equation. Similar relations exist for the higher molecular weight hydrocarbons, but the ratios are different. When the source of oxygen is air or other gas of approximately the same oxygen concentration, the reactant gas mixture is advantageously preheated to temperatures between about 300° C. and 800° C. With oxygen enriched air containing between about 20% to about 35% oxygen as the oxygen source, preheat temperatures of from room temperature to as high as about 600° C. may be used. When pure, or relatively pure, oxygen is used, no preheating is required to maintain the flame although the gases may be preheated to between room temperature and about 300° C. if desired.

The reactant gases pass from inlet manifold into reactor 31 wherein a controlled flame reaction is effected. The hot effluent gases are removed via line 32 and pass through interchanger 26 wherein heat may be indirectly transferred to the entering gases. These gases are then passed through line 33 into cooler 34 where they may be further cooled to the dew point or below depending upon the nature of the hydrogen cyanide and ammonia recovery methods applied.

This cool reactor effluent may be passed by means of line 35 and line 36 controlled by valve 37, line 38 and line 39, controlled by valve 40 into hydrogen cyanide recovery vessel 41 in which hydrogen cyanide may be removed in a variety of ways as hereinafter more fully described. In another modification, the cooled reactor effluent gas containing no condensate may be passed by means of line 35, line 42 and line 43 controlled by valve 44 and line 45 into selective adsorption column 46 wherein unreacted ammonia, if present, and the hydrogen cyanide product are recovered as substantially pure and separate fractions as hereinafter more fully described.

The reactor effluent may be cooled, if desired, to below the dew point to effect a partial separation of the water present since there are 3 mols of water vapor for every mol of hydrogen cyanide formed in the reactor. In this event the cooled effluent passes by means of line 35, line 42, and line 47 controlled by valve 48 into separator 49. The condensate, which consists of a dilute aqueous solution of hydrogen cyanide containing some dissolved ammonium cyanide, collects in the bottom of separator 49 and is removed therefrom through line 50 controlled by valve 51 which in turn is actuated by liquid level controller 52. The cooled but uncondensed portion of the effluent is removed from the upper portion of separator 49 by means of line 53 and may pass through lines 38 and 39 controlled by valve 40 into hydrogen cyanide recovery vessel 41, or it may pass through lines 53 and 38 and thence through line 54 controlled by valve 55 and through line 45 into selective adsorption column 46.

Referring now more particularly to hydrogen cyanide recovery vessel 41 several methods of recovery are applicable. In one modification, vessel 41 may comprise a bubble plate or other similar type of absorption column and the effluent gases may rise upwardly therethrough countercurrent to a downwardly flowing liquid absorbent. The liquid absorbent is introduced by means of line 56 controlled by valve 57 into the upper portion of vessel 41.

In one modification, this absorbent comprises an aqueous solution of a basically reacting compound such as an alkali metal or alkaline earth metal hydroxide or the like. An aqueous solution containing dissolved alkali or alkaline earth metal cyanide salts is thus formed in vessel 41 and is removed from the bottom thereof by means of line 57 controlled by valve 58 which in turn is actuated by liquid level controller 59. The undissolved gases substantially free of hydrogen cyanide are removed from the upper portion of vessel 41 by means of line 60 controlled by valve 61. This overhead gas contains unreacted ammonia which may be separated if desired by continuous selective adsorption and returned to the flame reactor.

In a second modification, recovery vessel 41 may contain a solid packing of an alkali metal or alkaline earth metal hydroxide in which case the passage of the hydrogen cyanide-containing gases results in the conversion of at least a part of the hydroxide to the corresponding metal cyanide. If desired, the metal hydroxide may be employed in a series of vessels as static beds, one being on stream while the others are being unloaded or loaded. The overhead gases produced in this modification also contain unreacted ammonia which may be recovered and recirculated with fresh ammonia feed to the flame reactor.

In a third modification, recovery vessel 41 may employ water as the absorbent in which case both the ammonia and the hydrogen cyanide are recovered together producing an aqueous solution containing hydrogen cyanide and ammonium cyanide.

In a fourth modification, vessel 41 may comprise a bubble tray tower in which an acid extractant is employed to remove ammonia from the reactor effluent allowing the hydrogen cyanide to pass overhead for removal through line 60 controlled by valve 61. Dilute inorganic acids may be employed such as hydrochloric or sulfuric or carbonic acid. Solutions of acid salts may be used advantageously, particularly the ammonium acid salts such as ammonium acid sulfate and the ammonium acid phosphates. In this modification the overhead gas may be separated by continuous selective adsorption or by other means indicated above for the separation of the hydrogen cyanide in substantially pure form.

In the preferred modification, however, the reactor effluent is cooled in product cooler 34 to a temperature above the dew point of the gas and the mixture is passed by means of line 35 and line 42 controlled by valve 44 through lines 43 and 45 into selective adsorption column 46 for separation as described below.

The continuous selective adsorption process is based upon preferential adsorption phenomena exhibited by solid adsorbents in which certain gaseous constituents are more strongly adsorbed than are others. In this particular gaseous mixture, comprising the reactor effluent, hydrogen cyanide and water vapor are the most readily adsorbable, ammonia is of intermediate adsorbability, and methane, hydrogen, nitrogen and carbon monoxide which, when present, are the least readily adsorbable constituents. This permits a highly efficient separation of the desired product from the gaseous mixture and also a separation of the unreacted ammonia in substantially pure form for recirculation. Unusually high conversion efficiencies are thus obtained.

Selective adsorption column 46 is provided, at successively lower levels therein, with adsorbent hopper 62, cooling zone 63, lean gas disengaging zone 64, adsorption zone 65, feed gas engaging zone 66, primary rectification zone 67, side cut gas product disengaging zone 68, secondary rectification zone 69, rich gas disengaging zone 70, steaming zone 71, heating zone 72, adsorbent feeder zone 73 and bottom zone 74. The adsorbent passes downwardly by gravity successively through the aforementioned zones as a moving bed and is removed from bottom zone 74 through transfer line 75 and is introduced into lift line 76. Herein a gaseous suspension of adsorbent is formed with a lift gas passed thereinto by lift gas blower 77 and transfer line 78 and the lift gas suspension is passed upwardly into impactless separator 79. Herein the lift gas suspension is broken and the adsorbent and lift gas pass downwardly through transfer line 80 as substantially independent phases into hopper 62 wherein the adsorbent collects. The lift gas then passes out of the upper portion of column 46 by means of line 81 and is returned by means of line 82 to lift gas blower 77 for recirculation.

The gaseous mixture to be separated passes by means of line 45 into feed gas engaging zone 66, and then upwardly through adsorption zone 65 wherein the preferential adsorption of the most readily adsorbable constituents occurs. The feed gas to adsorbent ratio varies with the type of adsorbent and the concentration of adsorbable constituents in the mixture. With charcoal as the adsorbent and a typical effluent gas, between 150 and 350 pounds of charcoal per thousand standard cubic feet is generally adequate. In this case a rich adsorbent containing adsorbed hydrogen cyanide, water vapor and ammonia is formed leaving a substantially unadsorbed lean gas containing hydrogen, nitrogen, carbon monoxide and methane substantially unadsorbed. A portion of this gas is removed from lean gas disengaging zone 64 as a lean gas product by means of line 83 and is passed into separator 84 in which suspended particles of adsorbent are separated. The lean gas product is removed therefrom by means of line 85 controlled by valve 86. The remaining portion of this lean gas product passes upwardly through the tubes of cooling zone 63 wherein it serves to saturate the downwardly flowing adsorbent with the constituents of the lean gas and to dehydrate the adsorbent. This portion of the lean gas joins the lift gas stream and is removed therewith by means of line 81. To avoid accumulation of the lift gas recycle a portion of the lift gas is continuously removed from line 81 through line 87 controlled by valve 88. This gas comprises a mixture of hydrogen, nitrogen, and carbon monoxide which has a substantially lower methane content than does the lean gas product. This lean gas may be employed as a source of pure hydrogen and nitrogen for ammonia preparation or may be discarded or burned.

The rich adsorbent formed in adsorption zone 65 passes downwardly into primary rectification zone 67 wherein it is contacted by a first reflux gas rich in ammonia. Since this constituent is more readily adsorbable than methane and the less readily adsorbable constituents, a preferential adsorption of ammonia occurs forming a partially rectified adsorbent and causing the desorption of small quantities of constituents desired in the lean gas product. These desorbed constituents pass upward and are removed with the lean gas.

The partially rectified adsorbent thus formed passes downwardly into secondary rectification zone 69 wherein the partially rectified adsorbent is contacted with a second reflux gas rich in hydrogen cyanide and water vapor and again preferential adsorption causes the desorption of ammonia forming a rectified charcoal. The temperatures maintained in secondary rectification zone are above the complete dissociation temperature of ammonium cyanide; thus a substantially complete separation is permitted. The wet ammonia thus desorbed collects in side cut gas disengaging zone 68 from which a portion passes into primary rectification zone 67 as said first reflux gas. The remaining portion is removed by means of line 89 and is introduced into separator 90 which serves to separate suspended particles of adsorbent. The ammonia side cut gas, substantially free of less readily adsorbable constituents and of hydrogen cyanide and water, is removed from separator 90 through line 91 controlled by valve 92 and is sent to storage or further processing facilities, not shown, by means of line 93 controlled by valve 94, or in the preferred modification is returned by means of line 95 controlled by valve 96 to the ammonia inlet line 10, wherein it is combined with fresh ammonia and introduced subsequently into flame reactor 31. Ammonium cyanide dissociates completely at temperatures below the boiling point of water and the adsorbed constituents, i. e., ammonia, hydrogen cyanide, and water, are readily separable by heating the rich charcoal to temperatures above the complete dissociation temperature.

The rectified charcoal formed in secondary rectification zone 69 passes downwardly into steaming zone 71 wherein the adsorbent is contacted with stripping steam effecting the preferential desorption of adsorbed hydrogen cyanide. A substantially complete hydrogen cyanide desorption is effected therein and the partially stripped adsorbent passes downwardly through the tubes of heating zone 72 wherein the adsorbent is indirectly heated by means of circulating flue gas or condensing vapors such as steam or mixtures of diphenyl and diphenyl oxide to a temperature of about 500° F. Additional quantities of steam are introduced by means of line 97 controlled by valve 98 into bottom zone 74 to pass upwardly through the tubes of heating zone 72 to effect a substantially complete stripping of the remaining quantities of hydrogen cyanide. The hydrogen cyanide together with water vapor collects in rich gas disengaging zone 70 from which a portion passes into secondary rectification zone 69 as said second reflux gas, while the remaining portion is removed from zone 70 by means of line 99 and is passed into rich gas cooler 100. The rich gas may contain as high as 75% or higher of hydrogen cyanide, the remaining material being water vapor. In one modification, cooler 100 merely cools this rich gas product to a liquid at its bubble point and this liquid is transferred by means of line 101 controlled by valve 102 into hydrogen cyanide distillation column 103 wherein the rich gas product is distilled to separate an overhead product of hydrogen cyanide and leaving a bottoms product comprising water. Other well known methods may be employed to prepare anhydrous acid. A portion of the bottoms product is passed through reboiler 104 to supply heat to the bottom of the column while the remainder is removed by means of line 105 controlled by valve 106. The overhead product passes through line 107 through condenser 108 and a portion of the condensate thus formed passes through line 109 as reflux to column 103. The remainder of the overhead product passes to production by means of line 110 controlled by valve 111 and consists of substantially pure hydrogen cyanide. A preferred method for separating the components of the product gas by preferential adsorption is described and claimed in my co-pending application, Serial No. 200,263, filed December 11, 1950.

Referring now to Figures 2, 3 and 4, cross sectional drawings of three modifications of flame reactors are shown in which flame reactions may be effected.

The reactor shown in Figure 2 comprises a cylindrical vessel 120 provided with reactant gas inlet 121 and effluent outlet 122. The behavior of this simple burner depends to some extent upon the dimensions. It was noted that in reactors of decreasing diameter, maintenance of the flame became increasingly difficult. The flame, upon which the reaction depends, tended to draw away from the burner walls forming an annular void between the flame and the wall of vessel 120. In reactors of larger diameter, the transverse area occupied by the flame compared to the transverse area of the vessel is greater. This is reflected in an increase in the quantity of ammonia converted to hydrogen cyanide since a greater proportion of reactant gas passes through the flame.

Packing 123 is provided through which the reactant gases pass at velocities greater than the flame propagation rate prior to entering flame 124 and a thorough mixing is achieved. This packing may comprise a bed of glass helices, sand, glass beads, porcelain pellets, or a porous sintered glass plate. With each type of packing, the flame tends to draw away from all adjacent solid surfaces. The mixed reactant gases pass through packing 123 into reaction zone 124a wherein reaction flame 124 is maintained at a gas velocity less than the flame propagation rate. The product gases are quenched in reaction zone 124a.

Referring now more particularly to Figure 3, a reactor is shown which comprises vessel 125 provided with reactant gas inlet 126, jacket gas inlet 127, and effluent gas outlet 128. Vessel 125 may be cylindrical and reactant gas inlet 126 may be cylindrical and concentric with vessel 125 at one end providing annular space 129a. The outside diameter $D_1$ of reactant gas inlet 126 is at least 80% and preferably between 90% and 99.5% of inside diameter $D_2$ of vessel 125, although smaller relative diameters may be employed. A packing may be employed in reactant gas inlet if desired. Flame 129 is maintained in reaction zone 130a wherein the product gases are quenched and rapidly cooled from the flame temperature through absorption of the heat of formation of the product. Flame 130 is annular in shape and is maintained by a combustible mixture introduced into annular space 129a via jacket gas inlet 127. The presence of annular flame 130 eliminates the drag effect of the vessel walls on synthesis flame 129. The heat loss from flame 129 through the vessel walls is also eliminated thus permitting flame 129 to assume a diameter equal to that of reactant gas inlet 126. By so operating, a substantially complete elimination of reactant gas by-passing around synthesis flame 129 results causing materially increased conversions over those obtainable with other types of burners.

In the synthesis of hydrogen cyanide from a hydrocarbon, ammonia, and oxygen, the reactant gas mixture containing methane, ammonia, and air for example is passed through reactant gas inlet 126 to maintain synthesis flame 129. A gaseous mixture of hydrocarbon, which may be natural gas for example, and air is introduced into annular space 129a and jacket flame 130 is thereby maintained. The temperature of flame 129 is quite high, between 1000° C. and 1500° C., but the gas products are rapidly quenched through absorption of heat in the formation of hydrogen cyanide, and the effluent is removed at a temperature of from 200° C. to 500° C.

With the apparatus shown in Figure 3 it has been possible to achieve hydrogen cyanide production efficiencies of greater than 90% based upon the quantity of ammonia reacted. This apparatus also permits a substantially reduced degree of reactant gas preheat.

Another modification of apparatus which may be employed as a flame reactor is shown in cross section in Figure 4. This apparatus comprises vessel 131 provided with reactant gas inlet 132 and effluent gas outlet 133. Vessel 131 is further provided with heating means 134 which may comprise, as shown in this figure, an electrical element 135 with connectors 136 and 137, or it may comprise a jacket by means of which heat is introduced from a circulating fluid. Through the application of localized heating, the flame is maintained in area 138 which, as previously shown, otherwise tends to draw away from the walls of vessel 131. In cylindrical vessels the flame in area 138 is circular and very thin having the shape of a disc.

The maximum hydrogen cyanide conversions are found when oxygen to ammonia ratios of from 0.8 to about 1.8 and ammonia to hydrocarbon ratios of from 0.75 to about 6.0 are employed in preparing the reactant gas mixture wherein the hydrocarbon contains up to about 6 carbon atoms per molecule. These ratios are valid also for higher molecular weight hydrocarbons as well. Since methane in the form of natural gas is readily available in large volume, this hydrocarbon is somewhat preferred over the others. For methane, or natural gas containing 75% or better methane, oxygen to ammonia ratios of from 1.2 to 1.8 may be used and preferably a ratio of about 1.5. The ammonia to hydrocarbon ratios in this instance may be from 0.75 to 1.25 although a ratio of about 1.0 is preferred.

When employing methane as the source of hydrocarbon and air which may be enriched with oxygen as the source of oxygen, it is desirable to form a reactant gas mixture containing between about 5% and 20% methane, from 5% to 20% ammonia, and from about 7.5% to 30% oxygen, the remainder being nitrogen. This gaseous mixture is preferably preheated to a temperature of between about 300° C. and 800° C. or higher. When employing pure oxygen in the reactant gas mixture, a reactant gas containing between 20% and about 40% by volume methane, 20% to 40% by volume ammonia, and 30% to 60% by volume of oxygen may be used. It is preferable however to use 25% to 35% of ammonia and methane and 30% to 50% oxygen. With hydrocarbons of higher molecular weight than methane, the concentration of hydrocarbon is lowered to compensate for increased quantities of carbon per mol of gas. In the foregoing description the hydrocarbon mentioned has been methane. However, any normally gaseous hydrocarbon including both the saturated and unsaturated normally gaseous hydrocarbons may be employed or mixtures of these hydrocarbons may be used as indicated in the accompanying examples. For example, natural gas is well suited to the process of this invention. Saturated hydrocarbons such as methane, ethane, propane and the butanes may be employed as well as unsaturated hydrocarbons, such as acetylene, ethylene, propylene, and the like, and in general the normally gaseous hydrocarbons having up to about 6 carbon atoms per molecule may be used. The normally liquid hydrocarbons such as pentane, hexane, etc., benzene, cyclohexane and the like may be employed as the source of active carbon in the flame synthesis reactions by first vaporizing these in a suitable vaporizer and mixing the resultant vapors in the correct proportions with ammonia and oxygen to form a suitable reactant gaseous mixture.

The fact that such a wide range of hydrocarbons may be employed in the practice of this invention gives this process another outstanding advantage over the conventional catalytic methods for hydrogen cyanide production. The rare metal catalysts, such as platinum, are very easily poisoned by hydrocarbons of higher molecular weight than methane and by other gaseous constituents such as carbon monoxide, hydrogen sulfide, and others. No such effect is noted in the non-catalytic flame synthesis process of this invention.

For the low molecular weight hydrocarbons having up to about 6 carbon atoms per molecule reactant gas mixtures having compositions falling within the following limits should be employed:

| Component | Oxygen Source | |
|---|---|---|
| | Pure Oxygen | Atmospheric Air |
| Hydrocarbon_____percent__ | 5–30 | 1–15 |
| Ammonia_____do____ | 25–45 | 10–17 |
| Oxygen_____do____ | 35–50 | 10–20 |

As a typical example of the process according to this invention the following data are given:

Example I

In an apparatus similar to that shown in Figure 2, a gaseous mixture containing 0.488 mol of ammonia, 0.488 mol of methane, and sufficient air to give an oxygen to ammonia ratio of 1.5 was employed. This gaseous mixture was heated to 800° C. and passed through a packed 1-inch diameter quartz tube. A yield of about 40.0% hydrogen cyanide on the basis of ammonia passed through the tube was obtained. The flame was disc shaped and drew away from adjacent surfaces.

Example II

A gaseous mixture similar to that employed in Example I was passed into the reactant gas inlet tube of an apparatus similar to that shown in Figure 3 and the mixture of methane and air was passed into the annular space surrounding this inlet tube so that the hydrogen cyanide production flame was surrounded by a cylinder of burning methane and air. Hydrogen cyanide yields of from 65% to 75% based on the quantity of ammonia reacted were obtained.

Example III

A gaseous mixture of methane, ammonia and oxygen analyzing 29% ammonia, 29% methane, and 42% oxygen by volume at room temperature was passed through an apparatus similar to that shown in Figure 3 in which the hydrogen cyanide flame was surrounded by an annular flame of burning methane and oxygen. A yield of 75% hydrogen cyanide based on the quantity of ammonia reacted was obtained.

Example IV

A gaseous mixture containing 10.9% methane, 10.9% ammonia, 16.4% oxygen, and 61.8% nitrogen was preheated to a temperature of 800° C. and passed into a flame synthesis reactor similar to that shown in Figure 3. Methane and air were also introduced to form a cylinder of flame about the disc shaped central flame formed by the reactant mixture. A 91.0% conversion of ammonia to hydrogen cyanide resulted.

Example V

A gaseous mixture analyzing 28% ammonia, 27% natural gas, and 45% oxygen was introduced into the reactant gas inlet and natural gas and air was introduced into the jacket flame inlet of a reactor similar to that shown in Figure 3. A steady easily controlled flame was maintained without preheating the reactant gases. An ammonia-hydrogen cyanide conversion of 89.0% was obtained.

Example VI

A reactant gas mixture containing 3.0% normal hexane vapor, 16.0% ammonia, 17.0% oxygen, and the remainder nitrogen was prepared and introduced into the reactor shown in Figure 3 at a preheat temperature of 550° C. An ammonia conversion to hydrogen cyanide of 73% was effected based on the quantity of ammonia consumed.

Example VII

A flame reactor effluent obtained from the conversion of a gaseous mixture of natural gas, ammonia, and air had approximately the following composition:

| | Per cent |
|---|---|
| Nitrogen | 55.0 |
| Hydrogen cyanide | 9.0 |
| Ammonia | 4.0 |
| Methane | 3.0 |
| Carbon monoxide | 3.0 |
| Carbon dioxide | 2.0 |
| Water vapor | 24.0 |
| | 100.0 |

This material was introduced into a continuous selective adsorption column wherein it was contacted with between 150 and 250 pounds of activated vegetable charcoal per 1,000 standard cubic feet of the effluent gas. A rich gas product was produced from the selective adsorption column at a rate of about 350 mols per 1,000 mols of effluent gas feed. This product contained about 25 mol per cent of hydrogen cyanide and was cooled to form a liquid at its bubble point. This liquid was introduced into a distillation column from which an overhead product comprising 99% hydrogen cyanide was produced. A rectified side cut gas product was produced simultaneously from the selective adsorption column at a rate of about 38 mols per 1,000 mols of effluent gas feed. This side cut gas product analyzed higher than 95 mol per cent ammonia and was returned with fresh ammonia feed to the flame generator. A small amount of stripping steam was introduced into the desorption zone of the selective adsorption column to insure substantially complete desorption of the adsorbed hydrogen cyanide and water. A temperature of 500° F. was employed as a maximum temperature in the desorption zone. In this combination process a 92% conversion of ammonia to hydrogen cyanide was obtained.

Particular embodiments of the present invention have been hereinabove described in considerable detail by way of illustration. It should be understood that various other modifications and adaptations thereof may be made by those skilled in this particular art without departing from the spirit and scope of this invention as set forth in the appended claims.

I claim:

1. A process for the production of hydrogen cyanide which comprises forming a reactant gas mixture essentially comprising between about 10 and about 17 per cent by volume of ammonia, between about 1 and about 15 per cent by volume of a hydrocarbon containing up to 6 carbon atoms and between about 10 and about 20 per cent by volume of oxygen in the form of air; passing said mixture into a synthesis flame maintained by the combustion of said mixture; burning a combustible gas mixture comprising a hydrocarbon and oxygen to form an auxiliary flame surrounding said synthesis flame, whereby said synthesis flame is caused to take the form of a thin flat disc, the dimension of which in the direction of its propagation is such that the time of passage of the reactant gas mixture through said synthesis flame is less than about $1 \times 10^{-4}$ second; and cooling the product gas to a temperature below that at which substantial reaction occurs immediately after its formation in said synthesis flame.

2. A process for the production of hydrogen cyanide which comprises forming a reactant gas mixture essentially comprising about one volume of ammonia, between about 0.17 and about 1.33 volumes of a hydrocarbon selected from the class consisting of methane and natural gas, and between about 0.8 and about 1.8 volumes of oxygen; passing said mixture into a synthesis flame maintained by the combustion of said mixture; burning a combustible gas mixture comprising a hydrocarbon and oxygen to form an auxiliary flame surrounding said synthesis flame, whereby said synthesis flame is caused to take the form of a thin flat disc, the dimension of which in its direction of propagation is such that the time of passage of the reactant gas through said synthesis flame is less than about $1 \times 10^{-4}$ second; and cooling the product gas to a temperature below that at which substantial reaction occurs immediately after its formation in said synthesis flame.

3. The process of claim 2 wherein the hydrocarbon component of the reactant gas mixture is methane.

4. The process of claim 2 wherein the hydrocarbon component of the reactant gas mixture is natural gas.

5. The process of claim 2 wherein the oxygen is in the form of air.

6. The process of claim 2 wherein the auxiliary flame is maintained by the combustion of a combustible gas mixture comprising air and a hydrocarbon selected from the class consisting of methane and natural gas.

7. The process of claim 2 wherein the reactant gas mixture is preheated to a temperature between about 300° C. and about 800° C. prior to its passage into the synthesis flame.

ART C. McKINNIS.

REFERENCES CITED

The following references are of record in the file of this patent:

UNITED STATES PATENTS

| Number | Name | Date |
|---|---|---|
| 758,774 | Pauling | May 3, 1904 |
| 779,998 | Gibbs | Jan. 10, 1905 |
| 1,035,732 | Phillips | Aug. 13, 1912 |
| 1,967,235 | Ferkel | July 24, 1934 |
| 2,069,545 | Carlisle et al. | Feb. 2, 1937 |
| 2,300,235 | Pines et al. | Oct. 27, 1942 |
| 2,347,496 | Muskat et al. | Apr. 25, 1944 |
| 2,403,451 | Nevins et al. | July 9, 1946 |
| 2,403,735 | Mason et al. | July 9, 1946 |
| 2,421,744 | Daniels | June 10, 1947 |